UNITED STATES PATENT OFFICE.

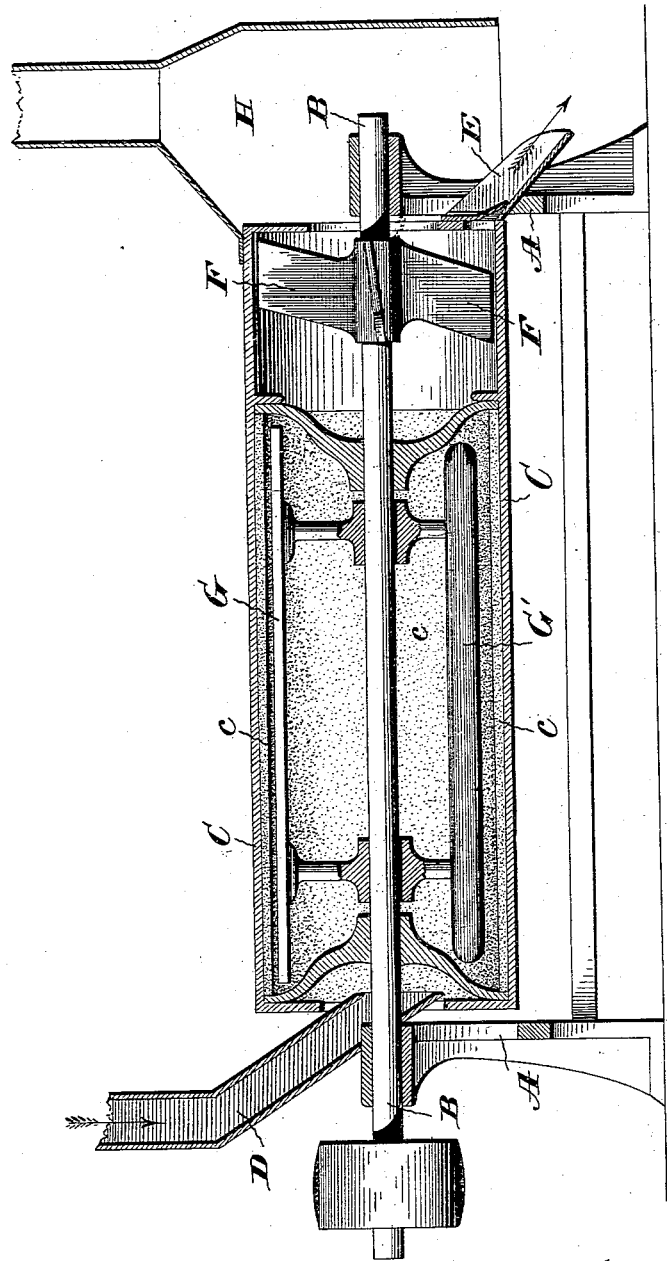

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 555,309, dated February 25, 1896.

Application filed June 7, 1895. Serial No. 551,993. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters;" and it consists in an improved cotton-seed delinter whose construction and arrangement of parts will be hereinafter described, and particularly pointed out in the claim.

In an application for Letters Patent filed by me on June 3, 1895, Serial No. 551,560, I have described a cotton-seed delinter in which the removal of the lint from the seed under treatment is effected by causing the lint to assume a rapid centrifugal movement around the inner abrading-surface of a cylinder, the lint separated from the seed being carried away by an air-current, and the seed being discharged through an opening in one end of the cylinder.

My present invention relates to the same class of delinters as that to which the delinter described in the above-referred-to application belongs, but in this case, instead of causing the seed to assume its centrifugal movement through the rapid rotation of blades extending longitudinally through the delinting-cylinder, I rotate the delinting-cylinder itself. I further provide means for interrupting and varying the formation of the roll which the seed forms around the inner surface of the rotating cylinder, so that new faces of the seed may be constantly presented to the abrading action.

My invention is fully described in the drawing which accompanies and forms a part of this application, in which the same reference-letters refer to the same or corresponding parts, and in which a central longitudinal section of my machine is represented.

Referring to the drawing, A represents the machine-frame. In this frame is journaled the shaft B, which has mounted thereon the delinting-cylinder C. The inner surface of the delinting-cylinder is lined with a smooth abrading substance c, such as finely-ground emery, it being essential in this class of delinters that the abrading-surface be smooth in order that the passage of the seed through the machine may be insured.

The feeding of the seed to the machine is effected through a feed-spout D, which opens into one end of the delinting-cylinder.

Discharge of the seed from the machine is effected through a discharge-spout E, stationed at the opposite or discharge end of the cylinder.

The seed fed into the machine is at once caused, by the action of the revolving cylinder, to assume the form of a roll around the inner surface of the same. If no means were used to interrupt and vary the formation of this roll it would extend continuously from one end of the delinting-cylinder to the other, and while passage of the seed through the machine would be insured by the action of the spirally-arranged fan F, which is mounted on the central shaft within an extension of the delinting-cylinder casing, only one surface of the seed would be subjected to the abrading action, so that the quality of product obtained would not be satisfactory.

To interrupt and vary the formation of the roll of seed formed in the machine and to cause new faces of the seed to be constantly presented to the abrading action, I make use of a check-plate G, which is mounted loosely upon the central shaft, extends longitudinally through the delinting-cylinder, and is held in close relation to the abrading-surface, so as to constantly interrupt the roll of seed formed. The check-plate is held stationary, or, at least, is permitted only a slight oscillatory movement by means of the counterbalance-weight G', which hangs diametrically opposite to the check-plate G.

The fan F operates in an extension of the delinting-cylinder, and by reason of its forward spiral inclination induces the forward passage of the seed through the machine. The air-current caused by the fan insures the removal through the air-flume H of the lint and dirt as rapidly as it is separated from the seed.

The operation of my machine is as follows: Seed is fed to the machine through the feed-spout D, and at once forms a roll around the inner surface of the revolving cylinder C. It is there subjected to the scouring action of the abrading-surface c, and is continually caused to present new faces to the said abrading action by reason of the check-plate G, which interrupts and varies the formation of the roll of seed during the entire revolution of the delinting-cylinder. Passage of seed through the machine is insured by the action of the spirally-arranged fan F, which rotates in an extension of the revolving cylinder and insures the removal of the lint and dirt separated from the seed through the air-flume H. The seed itself is discharged through the discharge-spout E in a thoroughly-cleansed condition.

Having thus fully described my invention, what I claim as new, and desire to secure by Letters Patent, is—

In a cotton-seed delinter, the combination with a revoluble shaft, and a cylinder lined with abrading material secured thereto, of a seed-inlet opening, a peripheral seed-discharge opening, means for producing a central air-current to remove the lint separated by the action of the machine, and a blade loosely mounted on said shaft, with its outer edge in close proximity to the lining of the cylinder, said blade being held from rotation by a counterbalance-weight secured thereto, substantially as described.

In testimony whereof I affix my signature in presence of two witnesses.

JAMES J. FAULKNER.

Witnesses:
C. L. BERLIN,
JOHN HALLUM.